United States Patent
Shirokoshi et al.

(10) Patent No.: US 7,148,663 B2
(45) Date of Patent: Dec. 12, 2006

(54) SWITCHING POWER SUPPLY CIRCUIT

(75) Inventors: Hideki Shirokoshi, Nagaokakyo (JP); Hiroshi Fujinaka, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/100,244

(22) Filed: Apr. 6, 2005

(65) Prior Publication Data

US 2005/0242787 A1 Nov. 3, 2005

(30) Foreign Application Priority Data

Apr. 28, 2004 (JP) ............................. 2004-133460

(51) Int. Cl.
*G05F 1/656* (2006.01)
(52) U.S. Cl. ...................... 323/222; 323/284; 323/285
(58) Field of Classification Search ................ 323/222, 323/224, 225, 299, 282, 284, 285, 351
See application file for complete search history.

(56) References Cited

U.S. PATENT DOCUMENTS

| | | | | |
|---|---|---|---|---|
| 5,161,097 | A * | 11/1992 | Ikeda | 363/124 |
| 5,929,615 | A * | 7/1999 | D'Angelo et al. | 323/224 |
| 6,271,651 | B1 * | 8/2001 | Stratakos et al. | 323/282 |
| 6,525,513 | B1 * | 2/2003 | Zhao | 323/222 |

FOREIGN PATENT DOCUMENTS

JP 10052034 A 2/1998

* cited by examiner

*Primary Examiner*—Gary L Laxton
(74) *Attorney, Agent, or Firm*—Akin Gump Strauss Hauer & Feld, LLP

(57) ABSTRACT

A switching power supply circuit attaining high power conversion efficiency and a low operation start lower-limit voltage is provided. The switching power supply circuit in accordance with the present invention comprises an input terminal to which an input voltage is input; an output terminal from which an output voltage is output; a choke coil and a rectifying device, connected in series between the input terminal and the output terminal, to which the input voltage is input and from which the output voltage is output; a voltage step-up switching device, one terminal of which is connected between the choke coil and the rectifying device and another terminal of which is connected to the grounding point of the circuit; a power supply control circuit, to which the output voltage is input as a drive power supply, for controlling the voltage step-up switching device and the rectifying device; a transistor connected between the input terminal and the output terminal in parallel with the series connection of the choke coil and the rectifying device; and a differential amplifier, to which a first voltage derived from the input voltage and a second voltage derived from the output voltage are input, for turning ON the transistor when the first voltage is higher than the second voltage and for turning OFF the transistor when the first voltage is lower than the second voltage.

5 Claims, 4 Drawing Sheets

SWITCHING POWER SUPPLY CIRCUIT

BACKGROUND OF THE INVENTION

The present invention relates to a switching power supply circuit.

In recent years, as electronic apparatuses have become compact in size, secondary batteries and dry batteries have been used generally as power supply sources for such electronic apparatuses. Since the voltage of a secondary battery or a dry battery varies depending on its discharge time (operating time), it is usually necessary to stabilize the voltage using a power supply circuit built in an electronic apparatus. Furthermore, for the purpose of attaining long time operation, in recent years there is an increasing strong demand for operation on secondary batteries or dry batteries at voltages lower than ever before.

A switching power supply circuit in accordance with prior art No. 1 satisfying this kind of demand has been disclosed in Japanese Patent No. 3138218. The switching power supply circuit in accordance with this prior art No. 1 will be described referring to FIG. 3.

The input power supply 102 shown in FIG. 3 consists of secondary batteries or dry batteries. In FIG. 3, components other than the input power supply 102 constitute the switching power supply circuit in accordance with the prior art No. 1. The connections of the respective components of the switching power supply circuit in accordance with the prior art No. 1 will be described below.

The input terminal 111 of the switching power supply circuit in accordance with the prior art no. 1 is connected to one terminal of the input power supply 102, batteries, and an input voltage Vin is applied thereto. The other terminal of the input power supply 102 is connected to the grounding point of the circuit. A choke coil 107 and an NPN transistor 311 (switching NPN power transistor) are connected in series between the input terminal 111 and the grounding point.

The anode of a diode 312 is connected to the connection point $J_{31}$ between the choke coil 107 and the NPN transistor 311. The cathode of the diode 312 is connected to the output terminal 112 of the switching power supply circuit.

One terminal of an input smoothing capacitor 103 is connected to the connection point $J_{32}$ between the input terminal 111 and the choke coil 107, and the other terminal thereof is connected to the grounding point. One terminal of an output capacitor 106 is connected to the connection point $J_{33}$ between the diode 312 and the output terminal 112, and the other terminal thereof is connected to the grounding point.

The anode of a diode 314 is connected to the connection point $J_{34}$ between the cathode of the diode 312 and the output terminal 112. The cathode of the diode 314 is connected to one terminal of a resistor 316, and the other terminal of the resistor 316 is connected to the grounding point.

The emitter of a PNP transistor 315 is connected to the input terminal 111, its base is connected to the connection point $J_{35}$ between the diode 314 and the resistor 316, and its collector is connected to the power supply terminal Vcc of a power supply control circuit 101. The PNP transistor 315 serves as a path through which power is supplied from the input terminal 111 to the power supply terminal Vcc of the power supply control circuit 101.

The anode of the diode 313 is connected to the output terminal 112, and its cathode is connected to the power supply terminal Vcc of the power supply control circuit 101.

The diode 313 serves as a path through which power is supplied from the output terminal 112 to the power supply terminal Vcc of the power supply control circuit 101.

Both the cathode of the diode 313 and the collector of the PNP transistor 315 are connected to the power supply terminal Vcc of the power supply control circuit 101, and power is supplied. The base of the NPN transistor 311 is connected to the control terminal VB of the power supply control circuit 101, and the switching operation of the NPN transistor 311 is controlled.

The output terminal 112 outputs an output voltage Vout. This output voltage Vout is fed back to the negative feedback terminal (terminal FB) of the power supply control circuit 101.

The operation of the switching power supply circuit in accordance with the prior art No. 1 configured as described above will be described below. First, the operation at the start of voltage step-up operation (at the start of switching operation) will be described. When the input voltage Vin is input from the input power supply 102 to the input terminal 111, the PNP transistor 315 is turned ON, and the input voltage Vin is applied to the power supply terminal Vcc of the power supply control circuit 101 via the PNP transistor 315.

When the PNP transistor 315 is in the ON state, the voltage between the collector and the emitter has a very small value, whereby a voltage nearly equal to the input voltage Vin is applied to the power supply terminal Vcc. For example, when it is assumed that the operation start lower-limit voltage V0 of the power supply control circuit 101 is 3.0 V and that the saturation voltage Vce between the collector and the emitter of the PNP transistor 315 is 50 mV, the power supply control circuit 101 starts operation if the input voltage Vin output from the input power supply 102 is 3.05 V.

When the power supply control circuit 101 starts operation, the NPN transistor 311 is driven by a drive signal from the control terminal VB of the power supply control circuit 101 and carries out switching operation. When the NPN transistor 311 is turned ON, the NPN transistor 311 feeds a supply current to the choke coil 107, and energy is stored therein. The diode 312 for rectification rectifies the counter electromotive force generated at the connection point $J_{31}$ on the basis of the stored energy when the current is cut off. The current generated by the counter electromotive force is applied to the output capacitor 106 via the rectifying diode 312. The output capacitor 106 is charged with this, whereby the output voltage Vout at the output terminal 112 is stepped up.

The output voltage Vout is fed back to the terminal FB of the power supply control circuit 101. The power supply control circuit 101 controls the switching operation of the NPN transistor 311 on the basis of the output voltage Vout input to the terminal FB so that the output voltage Vout becomes a constant voltage. In this way, the output voltage Vout is negatively fed back and becomes the constant voltage.

In the step-up switching power supply circuit shown in FIG. 3, the output voltage Vout has a voltage value higher than the input voltage Vin. When the potential of the output terminal 112 becomes higher than the potential of the input terminal 111, the diode 314 conducts and raises the potential of the base (the potential of the connection point $J_{35}$) of the PNP transistor 315, thereby turning OFF the PNP transistor 315. In this way, when the output voltage Vout becomes higher than the input voltage Vin, the PNP transistor 315 is turned OFF, and the output voltage Vout is supplied to the power supply terminal Vcc of the power supply control circuit 101 via the forward diode voltage of the diode 313.

Next, the operation during the stop (standby) of the voltage step-up operation will be described. During the stop (standby) of the voltage step-up operation, the power supply control circuit 101 outputs a drive signal from its control terminal VB. The switching operation of the NPN transistor 311 is stopped by the drive signal, and its OFF state is maintained.

The output voltage Vout lowers owing to discharge due to the consumption current of the power supply control circuit 101. When a sufficient time has passed after the stop of the voltage step-up operation, the output voltage Vout has a value represented by the following expression (1). The $Vf_{312}$ in the expression is the forward diode voltage of the rectifying diode 312.

$$V_{out} = V_{in} - Vf_{312} \quad (1)$$

If the three devices, the diode 314, the PNP transistor 315 and the resistor 316, are not present in this state, the voltage $V_{101}$ applied to the power supply terminal Vcc of the power supply control circuit 101 has a value represented by the following expression (2). The $Vf_{313}$ in the expression is the forward diode voltage of the diode 313.

$$V_{101} = V_{in} - Vf_{312} - Vf_{313} \quad (2)$$

When it is assumed that the operation start lower-limit voltage of the power supply control circuit 101 is V0, the operation start lower-limit voltage Vs viewed from the input power supply 102 is represented by the following expression (3).

$$Vs = V0 + Vf_{312} + Vf_{313} \quad (3)$$

The operation start lower-limit voltage Vs viewed from the input power supply 102 becomes higher than the actual operation start lower-limit voltage V0 of the power supply control circuit 101 by approximately 1.2 to 1.4 V (the voltage values of the forward diode voltages $Vf_{312}$ and $Vf_{313}$ of the diode 312 and the diode 313).

Since the switching power supply circuit in accordance with the prior art No. 1 has the diode 314, the PNP transistor 315 and the resistor 316, the operation start lower-limit voltage Vs is made lower. Hence, the operation of the power supply control circuit is made possible at the lower operation start lower-limit voltage Vs. This will be described below in detail.

During the stop of the voltage step-up operation, the output voltage Vout is lower than the input voltage Vin as described in the expression (1). A current flows from the emitter of the PNP transistor 315 to its base and the resistor 316. The base voltage $Vb_{315}$ of the PNP transistor 315 is represented by the following expression (4). The $Vbe_{315}$ in the expression (4) is the base-emitter voltage of the PNP transistor 315.

$$Vb_{315} = V_{in} - Vbe_{315} \quad (4)$$

Since the base voltage (the voltage at the connection point $J_{35}$) of the PNP transistor 315, represented by the expression (4), is higher than the output voltage Vout represented by the expression (1), the diode 314 is in the OFF state. The PNP transistor 315 is fully turned ON and saturated. Since the PNP transistor 315 is saturated, the voltage $V_{101}$ applied to the power supply terminal Vcc of the power supply control circuit 101 is represented by the following expression (5). The $Vce_{315}$ in the expression (5) is the saturation voltage between the collector and emitter of the PNP transistor 315.

$$V_{101} = V_{in} - Vce_{315} \quad (5)$$

The saturation voltage $Vce_{315}$ between the collector and emitter of the PNP transistor 315 is far lower than the forward diode voltages $Vf_{312}$ and $Vf_{313}$ of the diode 312 and the diode 313. The voltage $V_{101}$ in the expression (5) is higher than the voltage $V_{101}$ in the expression (2) by approximately 2Vf=1.2 to 1.4 V.

The operation start lower-limit voltage Vs viewed from the input power supply 102 is represented by the following expression (6) when it is assumed that the operation start lower-limit voltage of the power supply control circuit 101 is V0.

$$Vs = V0 + Vce_{315} \quad (6)$$

Since the saturation voltage $Vce_{315}$ is low, the operation start lower-limit voltage Vs viewed from the input power supply 102 has a value almost equal to or slightly higher than the actual operation start lower-limit voltage V0 of the power supply control circuit 101. The difference between the voltages in the expressions (3) and (6) is very large in the case of electronic apparatuses operating on secondary batteries or dry batteries.

As described above, in the switching power supply circuit in accordance with the prior art No. 1, the operation start lower-limit voltage can be lowered, and the input voltage Vin output from the input power supply 102 can have a low value. For example, in the case that the operation start lower-limit voltage V0 of the power supply control circuit 101 is 3 V, the switching power supply circuit in accordance with the prior art No. 1 can be started by using two dry batteries connected in series and having an output voltage of 3.3 V as an input power supply.

In the case that dry batteries are used as the input power supply 102, the reverse current flowing from the output capacitor 106 to the input power supply 102 degrades the dry batteries and shortens their service lives. It is therefore necessary to avoid the reverse current to the utmost.

When the input voltage Vin is higher than the output voltage Vout, the switching power supply circuit in accordance with the prior art No. 1 drives the PNP transistor 315 that forms a power supply path to the power supply control circuit 101. When the output voltage Vout is higher than the input voltage Vin, the switching power supply circuit in accordance with the prior art No. 1 drives the diode 313 that forms a power supply path to the power supply control circuit 101. Hence, in the switching power supply circuit in accordance with the prior art No. 1, the PNP transistor 315 and the diode 313 turn ON and OFF complementarily, whereby reverse current flow from the output capacitor 106 to the input power supply 102 is not generated.

In recent years, there is an increasing trend toward reducing the power consumption of electronic apparatuses, such as portable telephones, DSCs (Digital Still Cameras). The power conversion efficiency of the switching power supply circuit has thus become a very important factor.

The switching power supply circuit in accordance with the prior art No. 1 disclosed in Japanese Patent No. 3138218 has the consumption of the base current (switching device driving current) during the switching of the NPN transistor 311 and a power loss (power loss during rectification) due to the forward diode voltage $Vf_{312}$ of the rectifying diode 312. Hence, the switching power supply circuit of the prior art is disadvantageous in power conversion efficiency.

For this reason, at present, a switching power supply circuit in accordance with prior art No. 2 using a MOSFET (Metal Oxide Semiconductor Field-Effect Transistor)

switching device and MOSFET synchronized rectification instead of the NPN transistor 311 and the rectifying diode 312 has become mainstream.

The switching power supply circuit in accordance with the prior art No. 2 will be described referring to FIG. 4. FIG. 4 is a circuit diagram showing the configuration of the switching power supply circuit in accordance with the prior art No. 2. The switching power supply circuit in accordance with the prior art No. 2 has an input terminal 111 connected to one terminal of an input power supply 102 consisting of batteries; an input smoothing capacitor 103, one terminal of which is connected between the input terminal 111 and a choke coil 107 and the other terminal of which is connected to the grounding point of the circuit; the choke coil 107 and an N-channel MOSFET 104 connected in series between the input terminal 111 and the grounding point; a P-channel MOSFET 105, the drain of which is connected to the connection point $J_{41}$ between the choke coil 107 and the N-channel MOSFET 104; an output terminal 112 connected to the source of the P-channel MOSFET 105; a power supply control circuit 101, the power supply terminal Vcc of which is connected to the output terminal 112, the control terminal VG1 of which is connected to the gate of the N-channel MOSFET 104 and the control terminal VG2 of which is connected to the gate of the P-channel MOSFET 105; and an output capacitor 106, one terminal of which is connected to the connection point $J_{43}$ between the P-channel MOSFET 105 and the output terminal 112, and the other terminal of which is connected to the grounding point. In FIG. 4, the same components as those shown in FIG. 3 are designated by the same numerals.

The switching power supply circuit in accordance with the prior art No. 2 has a power loss (power loss during rectification) due to a voltage drop determined by [ON resistance×current] at the P-channel MOSFET 105 for synchronized rectification.

The voltage drop at the P-channel MOSFET 105 is far lower than the forward diode voltage of the rectifying diode 312 shown in FIG. 3. The power loss due to the rectifying operation of the P-channel MOSFET 105 is less than the power loss at the rectifying diode 312. Hence, the switching power supply circuit in accordance with the prior art No. 2 is improved in power conversion efficiency in comparison with the switching power supply circuit in accordance with the prior art No. 1.

Next, the operation of the switching power supply circuit in accordance with the prior art No. 2 at the start of voltage step-up operation (at the start of switching operation) will be described below. When an input voltage Vin is applied from the input power supply 102 to the input terminal 111, a current flows through the parasitic diode of the P-channel MOSFET 105. The output voltage Vout obtained at this time is represented by the following expression. In the following expression, Vd is the forward diode voltage of the parasitic diode of the P-channel MOSFET 105 and is approximately 0.7 V.

$$V\text{out}=V\text{in}-Vd$$

When the output voltage Vout reaches the operation start lower-limit voltage V0 of the power supply control circuit 101 (V0=Vin−Vd), the power supply control circuit 101 generates a drive signal, whereby the N-channel MOSFET 104 and the P-channel MOSFET 105 carry out switching operation. Hence, the output voltage Vout is stepped up to a predetermined voltage. Since the parasitic diode of the P-channel MOSFET 105 is reverse biased by the output voltage Vout having been stepped up, it is turned OFF when the switching power supply circuit starts voltage step-up operation.

The switching power supply circuit in accordance with the prior art No. 2 does not operate when the input voltage Vin is not higher than the operation start lower-limit voltage V0 of the power supply control circuit 101 by the forward diode voltage Vd (approximately 0.7 V) of the parasitic diode (Vin=V0+Vd) or more. For example, when the operation start lower-limit voltage V0 of the power supply control circuit 101 is 3 V, the switching power supply circuit in accordance with the prior art No. 2 does not started using two dry batteries connected in series and having an output voltage of 3.3 V.

In the switching power supply circuit in accordance with the prior art No. 1, the operation start lower-limit voltage can be lowered, but high power conversion efficiency cannot be attained. In the switching power supply circuit in accordance with the prior art No. 2, high power conversion efficiency can be attained, but the operation start lower-limit voltage cannot be lowered.

In consideration of this, it is conceivable that the circuit devices (the diode 313, diode 314, PNP transistor 315 and resistor 316) in accordance with the prior art No. 1 capable of lowering the operation start lower-limit voltage are installed in the switching power supply circuit in accordance with the prior art No. 2 capable of attaining high power conversion efficiency. However, if the circuit devices (the diode 313, diode 314, PNP transistor 315 and resistor 316) in accordance with the prior art No. 1 are installed in the switching power supply circuit in accordance with the prior art No. 2, the circuit thus obtained does not operate properly as described below.

It is assumed that the diode 313 is inserted in the path from the output terminal 112 to the power supply terminal Vcc of the power supply control circuit 101 in the switching power supply circuit in accordance with the prior art No. 2. When the output voltage Vout having been stepped up becomes higher than the input voltage Vin, the voltage supplied to the power supply terminal Vcc of the power supply control circuit 101 becomes [the output voltage Vout−the voltage drop $Vf_{313}$ of the diode 313]. The High-level gate voltage of the synchronized rectification MOSFET 105, output from the power supply control circuit 101, becomes lower than the source voltage of the MOSFET 105 by $Vf_{313}$ (approximately 0.7 V), and the P-channel MOSFET 105 is not turned OFF. Hence, the power supply control circuit 101 cannot properly drive the P-channel MOSFET 105, and the P-channel MOSFET 105 remains ON.

If only the diode 314, PNP transistor 315 and resistor 316 among the circuit devices of the prior art No. 1 are installed in the switching power supply circuit in accordance with the prior art No. 2 (the diode 313 is short-circuited), the circuit thus obtained does not operate properly as described below.

When the output voltage Vout having been stepped up becomes higher than the input voltage Vin, the collector voltage of the PNP transistor 315 becomes Vout, and the base voltage of the PNP transistor 315 becomes [the output voltage Vout−the voltage drop $Vf_{314}$ of the diode 314]. Hence, the base-collector voltage Vbc of the PNP transistor 315 becomes approximately 0.7 V, and the PNP transistor 315 becomes ON at all times. An unnecessary current flows reversely from the collector to the emitter of the PNP transistor 315 and to the input power supply 102. In particular, in the case that the input power supply 102 consists of primary batteries, such as dry batteries, the phenomenon of the reverse flow of the current to the primary batteries 102 will abruptly shorten the service lives of the primary batteries 102.

Consequently, it is impossible to attain both high power conversion efficiency and low operation start lower-limit voltage by installing the circuit devices (the diode 313, diode 314, PNP transistor 315 and resistor 316) in accordance with the prior art No. 1 capable of lowering the operation start lower-limit voltage in the switching power supply circuit in accordance with the prior art No. 2 capable of attaining high power conversion efficiency. Conventionally, switching power supply circuits capable of attaining both high power conversion efficiency and low operation start lower-limit voltage have not been present.

SUMMARY OF THE INVENTION

The present invention is intended to provide a switching power supply circuit that attains high power conversion efficiency and a low operation start lower-limit voltage.

The present invention is intended to provide a switching power supply circuit that reduces a voltage drop caused in means for supplying a drive voltage to a power supply control circuit.

The present invention is intended to provide a switching power supply circuit that prevents reverse current having a danger of degrading dry batteries.

For the purpose of solving the above-mentioned problems, the present invention has the following configuration.

A switching power supply circuit in accordance with an aspect of the present invention comprises an input terminal to which an input voltage is input; an output terminal from which an output voltage is output; a choke coil and a rectifying device, connected in series between the input terminal and the output terminal, to which the input voltage is input and from which the output voltage is output; a voltage step-up switching device, one terminal of which is connected between the choke coil and the rectifying device and another terminal of which is connected to the grounding point of the circuit; a power supply control circuit, operating on the output voltage serving as a power supply source, for controlling the voltage step-up switching device and the rectifying device; a transistor connected between the input terminal and the output terminal in parallel with the series connection of the choke coil and the rectifying device; and a differential amplifier, to which a first voltage which is either the input voltage or a voltage derived from the input voltage and a second voltage which is either the output voltage or a voltage derived from the output voltage are input, for turning ON the transistor when the first voltage is higher than the second voltage and for turning OFF the transistor when the first voltage is lower than the second voltage.

The present invention can realize a switching power supply circuit capable of attaining high power conversion efficiency and lowering its operation start lower-limit voltage.

The present invention can realize a switching power supply circuit that reduces a voltage drop caused in means for supplying a drive voltage to a power supply control circuit.

The present invention can realize a switching power supply circuit that prevents reverse current having a danger of degrading dry batteries.

The above-mentioned switching power supply circuit in accordance with another aspect of the present invention is further characterized in that the transistor is a P-channel MOSFET or a PNP transistor, that the first voltage is input to the inverting input terminal of the differential amplifier and the second voltage is input to the noninverting input terminal thereof, and that the output voltage of the differential amplifier is applied to the gate of the P-channel MOSFET or the base of the PNP transistor.

The present invention can realize a switching power supply circuit capable of attaining high power conversion efficiency and lowering its operation start lower-limit voltage.

The above-mentioned switching power supply circuit in accordance with another aspect of the present invention is further characterized in that when the input voltage and the output voltage are the same voltage, the second voltage is higher than the first voltage by a predetermined voltage or a predetermined ratio.

In the switching power supply circuit in accordance with the present invention, the differential amplifier brings the transistor into conduction only when the input voltage is higher than the output voltage by the difference or more obtained between the second voltage and the first voltage when the input voltage and the output voltage are the same voltage. The differential voltage obtained between the second voltage and the first voltage when the input voltage and the output voltage are the same voltage is set higher than the maximum value (for example, 7 mV) of the offset voltage between the inverting input terminal and the noninverting input terminal of the differential amplifier. Hence, no current flows from the output terminal to the input terminal through the transistor conducted, whereby reverse current flow to the batteries serving as an input power supply can be prevented.

The differential voltage obtained between the second voltage and the first voltage when the input voltage and the output voltage are the same voltage should preferably be set at a value higher than the maximum value of the input offset voltage of the differential amplifier and yet as low as possible. The setting value should be lower than at least the ON voltage (approximately 0.7 V) of a diode.

The above-mentioned switching power supply circuit in accordance with another aspect of the present invention is further characterized in that the rectifying device is a P-channel MOSFET, the gate of which is connected to the power supply control circuit, the drain of which is connected to the choke coil, and the source of which is connected to the output terminal.

With the switching power supply circuit in accordance with the present invention, the power loss (power loss during rectification) owing to the voltage drop at the P-channel MOSFET for synchronized rectification can be reduced significantly. Hence, the present invention can realize a switching power supply circuit capable of attaining high power conversion efficiency and lowering its operation start lower-limit voltage.

The above-mentioned switching power supply circuit in accordance with another aspect of the present invention is further characterized in that the rectifying device is a diode, the anode of which is connected to the choke coil, and the cathode of which is connected to the output terminal.

The switching power supply circuit in accordance with the present invention can lower its operation start lower-limit voltage.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENT

An embodiment specifically demonstrating the best mode for embodying the present invention will be described below referring to the accompanying drawings.

<Embodiment>

Figure 1:
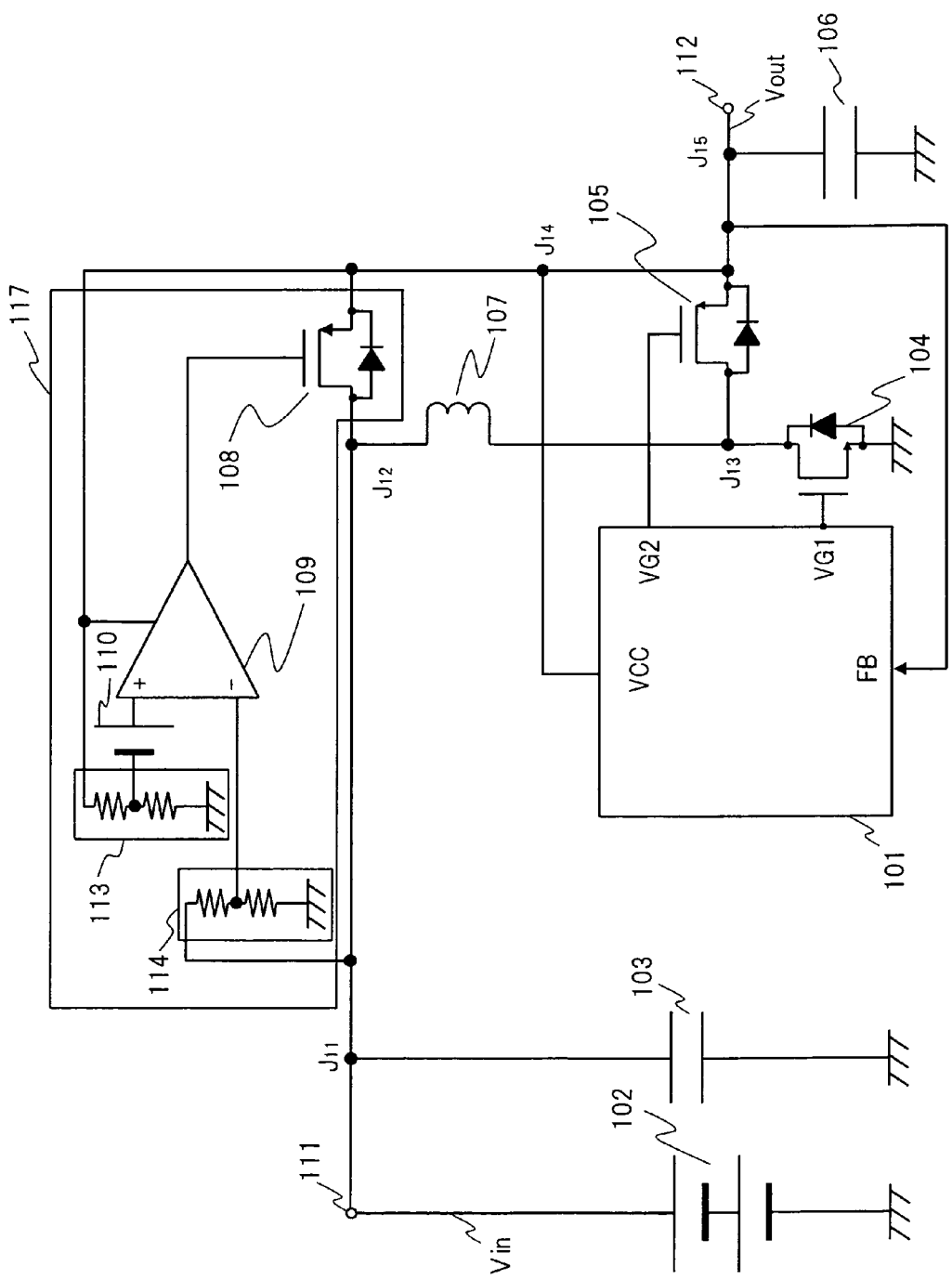
FIG. 1 is a circuit diagram showing the configuration of a switching power supply circuit in accordance with an embodiment of the present invention.
Figure 2:
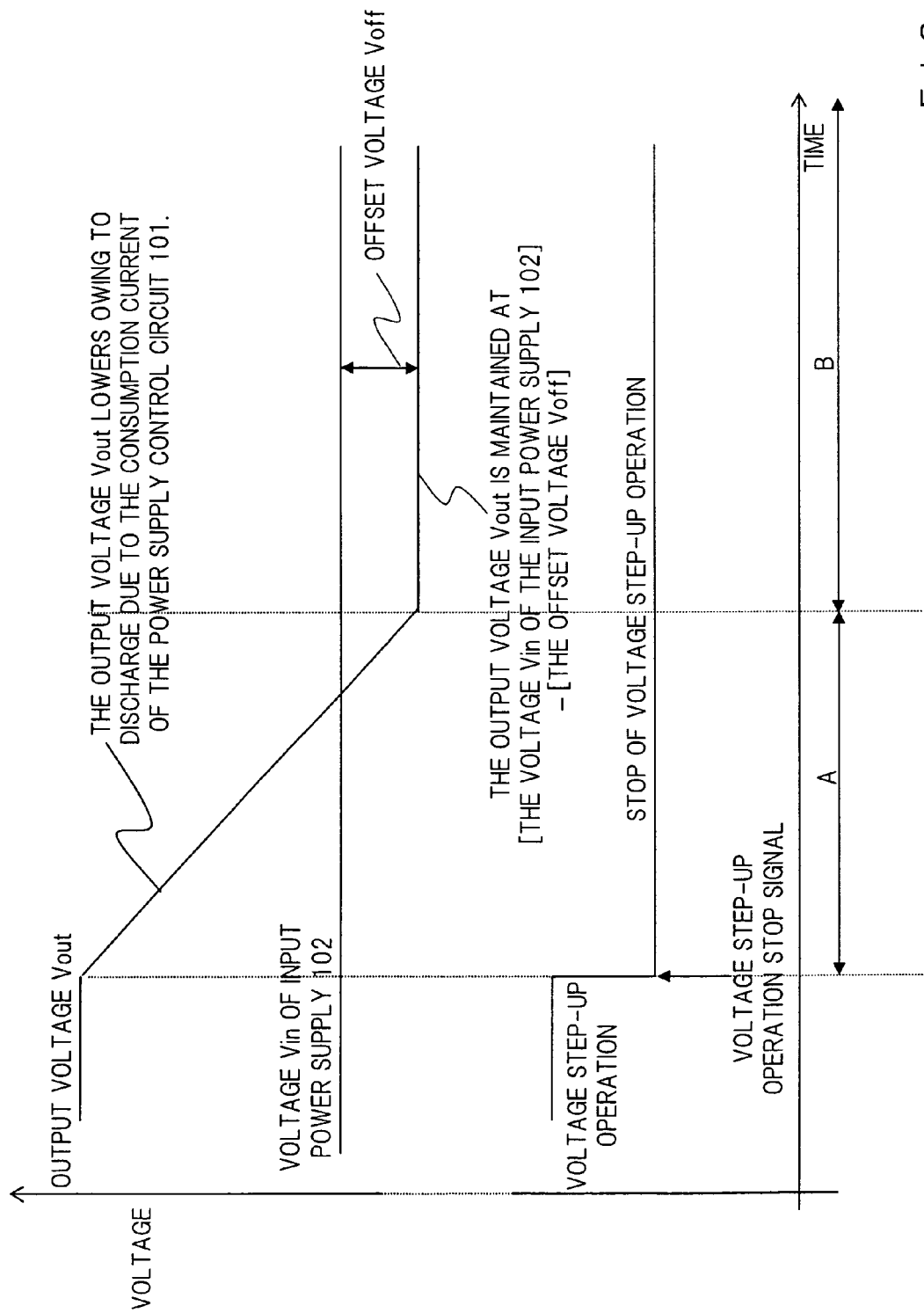
FIG. 2 is a graph showing the change in output voltage with respect to time during the stop of voltage step-up operation in the switching power supply circuit in accordance with the embodiment of the present invention.

A switching power supply circuit in accordance with an embodiment of the present invention will be described below referring to FIGS. 1 and 2. FIG. 1 is a circuit diagram showing the configuration of the switching power supply circuit in accordance with the embodiment of the present invention. In FIG. 1, an input power supply 102 is a power supply, such as secondary batteries or primary batteries (for example, dry batteries). One terminal of the input power supply 102 is connected to the grounding point of the circuit and the other terminal thereof is connected to the input terminal 111 of the switching power supply circuit in accordance with the embodiment of the present invention.

The switching power supply circuit in accordance with the embodiment of the present invention has an input terminal 111 connected to the input power supply 102 consisting of batteries; an input smoothing capacitor 103, one terminal of which is connected to the connection point $J_{11}$ between the input terminal 111 and a P-channel MOSFET 108 and the other terminal of which is connected to the grounding point; a choke coil 107, one terminal of which is connected to the connection point $J_{12}$ between the input terminal 111 and the P-channel MOSFET 108; an N-channel MOSFET 104 connected between the other terminal of the choke coil 107 and the grounding point; a P-channel MOSFET 105, the drain of which is connected to the connection point $J_{13}$ between the choke coil 107 and the N-channel MOSFET 104; an output terminal 112 connected to the source of the P-channel MOSFET 105; an output voltage control circuit 117 including a P-channel MOSFET 108 connected between the input terminal 111 and the output terminal 112 so as to be parallel with the series connection of the choke coil 107 and the P-channel MOSFET 105; a power supply control circuit 101, the power supply terminal Vcc of which is connected to the connection point $J_{14}$ between the P-channel MOSFET 108 and the output terminal 112, the control terminal VG1 of which is connected to the gate of the N-channel MOSFET 104 and the control terminal VG2 of which is connected to the gate of the P-channel MOSFET 105; and an output capacitor 106, one terminal of which is connected to the connection point $J_{15}$ between the P-channel MOSFET 105 and the output terminal 112 and the other terminal of which is connected to the grounding point.

Figure 3:
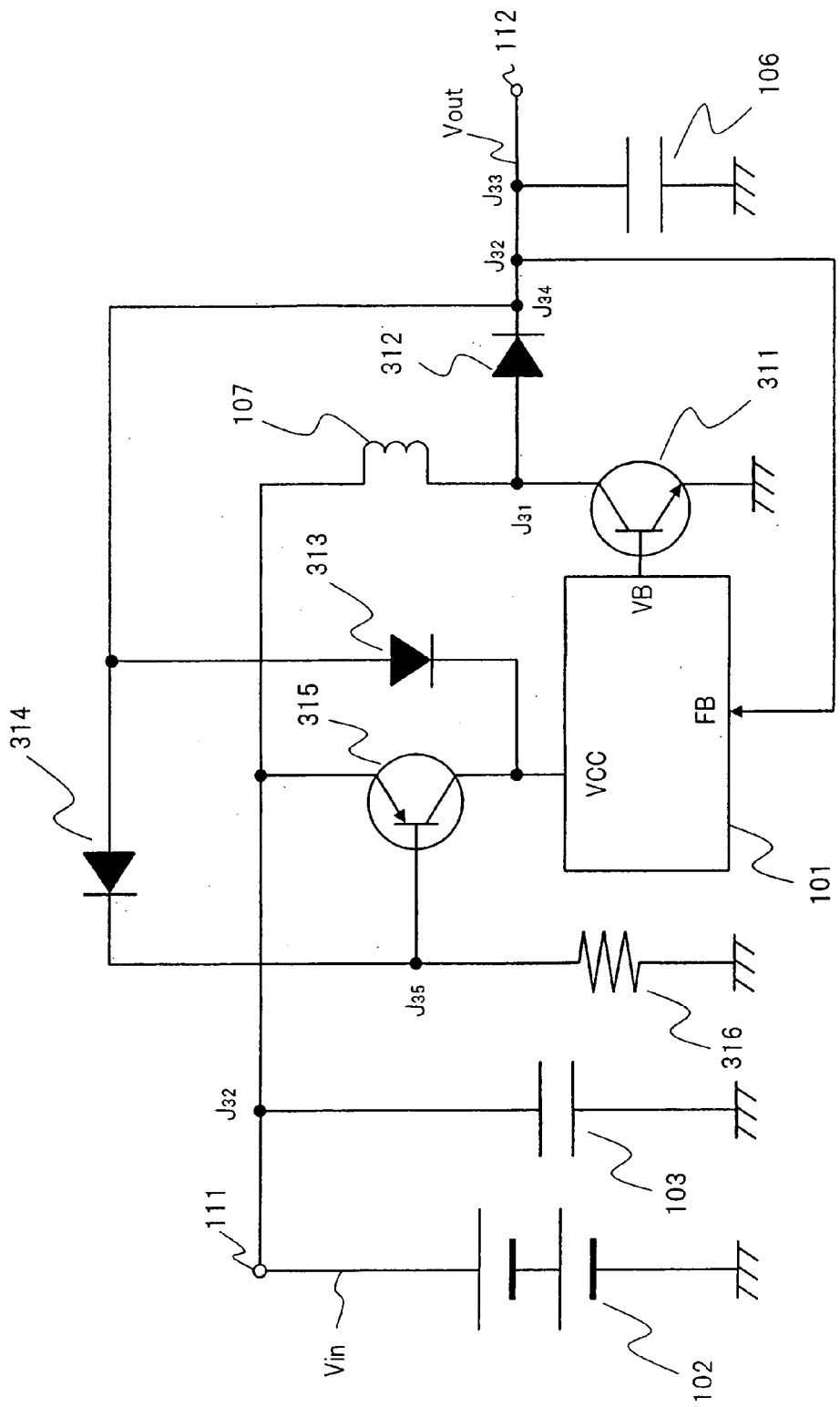
FIG. 3 is a circuit diagram showing the configuration of the switching power supply circuit in accordance with the prior art No. 1.
Figure 4:
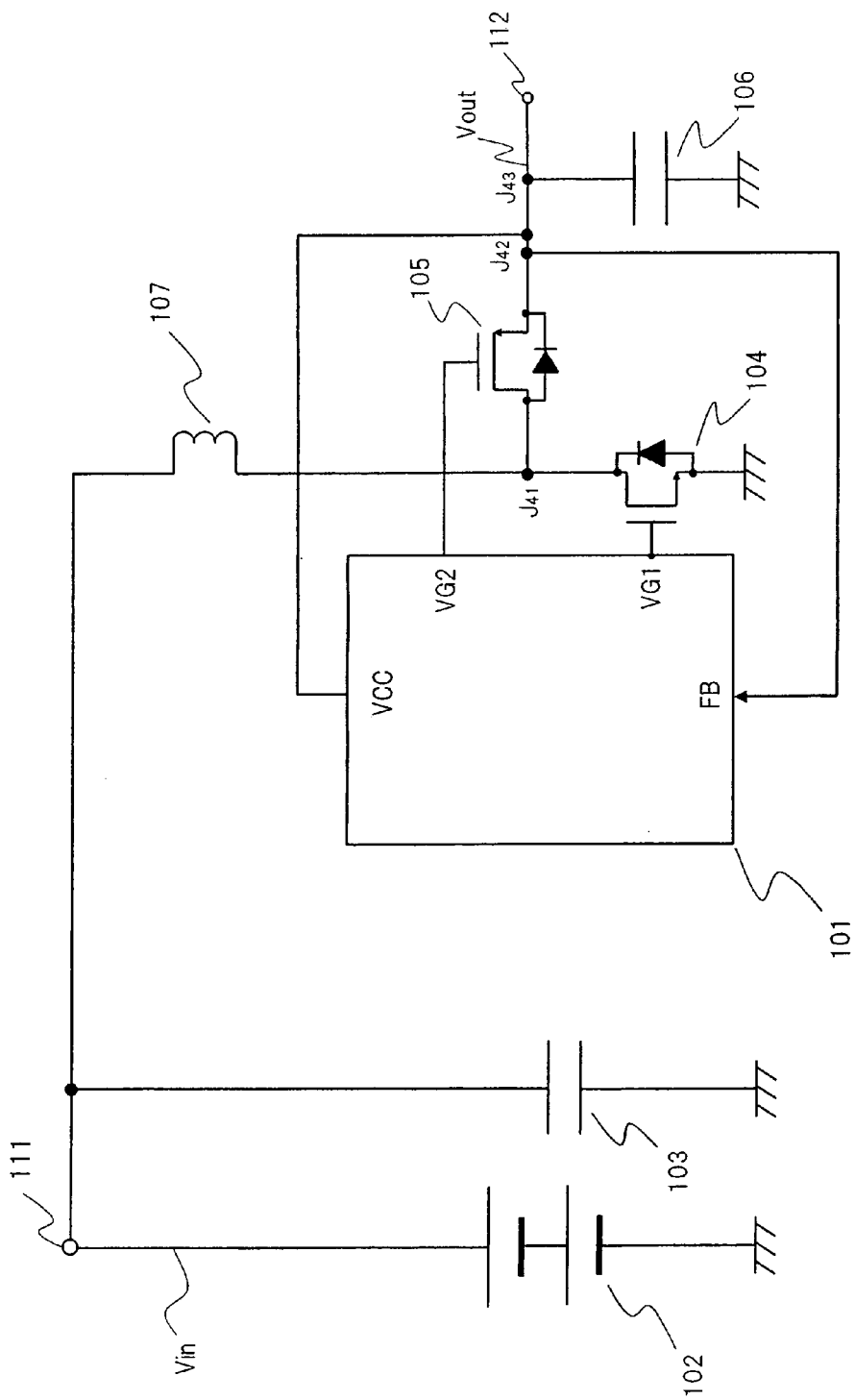
FIG. 4 is a circuit diagram showing the configuration of the switching power supply circuit in accordance with the prior art No. 2.

The output voltage control circuit 117 has a voltage divider circuit 114 connected between the input terminal 111 and the grounding point; a voltage divider circuit 113 connected between the output terminal 112 and the grounding point; an offset voltage supply 110, one terminal of which is connected to the intermediate connection point of the two resistors of the voltage divider circuit 113; a differential amplifier 109, the noninverting input terminal of which is connected to the other terminal of the offset voltage supply 110 and the inverting input terminal of which is connected to the intermediate connection point of the two resistors of the voltage divider circuit 114; and the P-channel MOSFET 108, the gate of which is connected to the output terminal of the differential amplifier 109, the drain of which is connected to the input terminal 111 and the source of which is connected to the output terminal 112. In FIG. 1 (the embodiment), the components corresponding to those shown in FIG. 3 (the prior art No. 1) and FIG. 4 (the prior art No. 2) are designated by the same numerals.

The respective components constituting the switching power supply circuit in accordance with the embodiment of the present invention will be described below. The input voltage Vin output from the input power supply 102 is input to the input terminal 111. The input voltage Vin is smoothed by the input smoothing capacitor 103 and applied to the choke coil 107 and the P-channel MOSFET 108.

In the embodiment, the voltage that is input from the input power supply 102 to the input terminal 111, smoothed by the input smoothing capacitor 103 and applied to the choke coil 107 and the drain of the P-channel MOSFET 108 is referred to as "input voltage Vin." The voltage output from the source of the P-channel MOSFET 105 and the source of the P-channel MOSFET 108, smoothed by the output capacitor 106 and output from the output terminal 112 is referred to as "output voltage Vout."

The power supply control circuit 101 is driven when the output voltage Vout is applied to the power supply terminal Vcc, and outputs drive signals from the control terminals VG1 and VG2, thereby controlling the switching operation of the N-channel MOSFET 104 and the P-channel MOSFET 105.

The gate of the N-channel MOSFET 104 is connected to the control terminal VG1 of the power supply control circuit 101, the source of the N-channel MOSFET 104 is connected to the connection point $J_{13}$ of the choke coil 107 and the P-channel MOSFET 105 and the drain of the N-channel MOSFET 104 is connected to the grounding point. The N-channel MOSFET 104 carries out switching operation for turning on/off energization to the choke coil 107 on the basis of the drive signal output from the control terminal VG1 of the power supply control circuit 101.

The choke coil 107 connected to the input terminal 111 repeats operation for receiving the input voltage Vin and storing energy and operation for releasing the stored energy according to the switching operation of the N-channel MOSFET 104.

The gate of the P-channel MOSFET 105 is connected to the control terminal VG2 of the power supply control circuit 101, the source of the P-channel MOSFET 105 is connected to the connection point $J_{15}$ of the output capacitor 106 and the output terminal 112 and the drain of the P-channel MOSFET 105 is connected to the connection point $J_{13}$ connected to the choke coil 107. The P-channel MOSFET 105 rectifies the counter electromotive force generated at the connection point $J_{13}$ on the basis of the energy stored in the choke coil 107 when the current passing through the choke coil 107 is cut off. The P-channel MOSFET 105 then transmits the obtained voltage to the output capacitor 106.

The voltage (counter electromotive force) owing to the energy stored in the choke coil 107 and the input voltage Vin are transmitted to the output capacitor 106. The output capacitor 106 smoothes the transmitted voltage and outputs the smoothed voltage to the output terminal 112. The output terminal 112 outputs the output voltage Vout that is stepped up from the input voltage Vin. The negative feedback terminal (terminal FB) of the power supply control circuit 101 is connected to the output terminal 112 and receives the output voltage Vout, and negative feedback control is carried out so that the output voltage Vout becomes a constant voltage.

The components constituting the output voltage control circuit 117 will be described below. The voltage divider circuit 114 divides the input voltage Vin using two resistors. The voltage obtained by the division is input to the inverting input terminal of the differential amplifier 109.

The voltage divider circuit 113 divides the output voltage Vout using two resistors.

The offset voltage supply 110 is a circuit (an equivalent circuit is shown in FIG. 1) for generating a predetermined offset voltage (upward voltage) Voff. The offset voltage supply 110 raises the voltage obtained by the division using the voltage divider circuit 113 by the predetermined offset voltage, and the resultant voltage is input to the noninverting input terminal of the differential amplifier 109. The offset voltage Voff is set so as to have a value higher than the variation in the input offset voltage of the differential amplifier 109 and so as to be as low as possible in the range satisfying the above-mentioned condition. The offset voltage Voff is set at least at a value lower than the ON voltage (approximately 0.7 V) of a diode. The details will be described later.

The differential amplifier 109 operates when the output voltage Vout is applied to its power supply terminal. Since the internal configuration of the differential amplifier 109 is far simpler than that of the power supply control circuit 101, the operation start lower-limit voltage of the differential amplifier 109 is usually lower than the operation start lower-limit voltage of the power supply control circuit 101 by the value or more of the forward diode voltage $Vf_{108}$ of the parasitic body diode associated with the P-channel MOSFET 108. In the embodiment, the operation start lower-limit voltage of the differential amplifier 109 is lower than the operation start lower-limit voltage (for example, 3 V) of the power supply control circuit 101 by the value or more of the forward diode voltage $Vf_{108}$ (approximately 0.7 V) of the body diode of the P-channel MOSFET 108.

The sum voltage of the output voltage Vout and the offset voltage Voff is input to the noninverting input terminal of the differential amplifier 109, and the input voltage Vin is input to its inverting input terminal. The difference voltage between the two is amplified and output.

The output terminal of the differential amplifier 109 is connected to the gate of the P-channel MOSFET 108. The differential amplifier 109 brings the P-channel MOSFET 108 into conduction only when [the output voltage Vout]< [the input voltage Vin–the offset voltage Voff]. When the P-channel MOSFET 108 is in the ON state, the P-channel MOSFET 108 outputs [the input voltage Vin–the offset voltage Voff] by virtue of the output voltage of the differential amplifier 109.

Since the offset voltage Voff has a value higher than the variation in the input offset voltage of the differential amplifier 109, a current flows from the input terminal 111 to the output terminal 112 without fail when the P-channel MOSFET 108 is brought into conduction. Hence, there is no danger of reverse current flow from the output terminal 112 to the input power supply 102, such as dry batteries, through the P-channel MOSFET 108.

[Operation of the switching power supply circuit shown in FIG. 1 during voltage step-up operation]

The operation of the switching power supply circuit configured as described above during voltage step-up operation will be described below. In the switching power supply circuit in accordance with the embodiment, the input voltage Vin output from the input power supply 102 is input to the input terminal 111. Since the differential amplifier 109 is not operating at the beginning of the input of the input voltage Vin, the P-channel MOSFET 108 serving as a switch is in the OFF state. The P-channel MOSFET 108 outputs [the input voltage Vin–the forward diode voltage $Vf_{108}$ of the body diode] through its body diode. This voltage is applied to the power supply terminal of the differential amplifier 109, and the differential amplifier 109 immediately starts operation.

Since [the output voltage Vout (=the input voltage Vin–the forward diode voltage $Vf_{108}$ of the body diode)] is lower than [the input voltage Vin–the offset voltage Voff], the differential amplifier 109 brings the P-channel MOSFET 108 into conduction. The P-channel MOSFET 108 is turned ON by the output voltage of the differential amplifier 109, and outputs [the input voltage Vin–the offset voltage Voff] as the output voltage Vout. The output voltage Vout is applied to the power supply terminal Vcc of the power supply control circuit 101, and the power supply control circuit 101 starts operation.

During the voltage step-up operation, the power supply control circuit 101 alternately repeats the ON/OFF switching operation of the N-channel MOSFET 104 and the P-channel MOSFET 105 via the control terminals VG1 and VG2.

When the N-channel MOSFET 104 is in the ON state, the choke coil 107 stores energy. At this time, the gate-source voltage Vgs of the N-channel MOSFET 104 reaches the power supply voltage of the power supply control circuit 101, that is, the output voltage Vout of the switching power supply circuit. For example, if the output voltage is 3.3 V, the gate-source voltage Vgs of the N-channel MOSFET 104 becomes 3.3 V.

For the purpose of attaining a sufficiently low ON resistance in general-purpose MOSFETs mounted in portable telephones, DSCs and the like at the present time, such MOSFETs must be used at a gate-source voltage of 3 V or more. If the output voltage Vout is 3.3 V, the gate-source voltage becomes 3 V or more, whereby the N-channel MOSFET 104 can have a sufficiently low ON resistance. Hence, the power loss caused by [(the ON resistance)×(the square of the current)] of the N-channel MOSFET 104 can be reduced.

When the N-channel MOSFET 104 is in the ON state, the P-channel MOSFET 105 for synchronized rectification is in the OFF state since its gate voltage is controlled so as to have the same voltage as the output voltage Vout via the control terminal VG2 of the power supply control circuit 101.

When the N-channel MOSFET 104 is in the OFF state, the power supply control circuit 101 turns ON the P-channel MOSFET 105, and the energy stored in the choke coil 107 and the input voltage Vin are transmitted to the output capacitor 106. At this time, for the purpose of preventing a through current from flowing from the output capacitor 106 through the P-channel MOSFET 105 to the N-channel MOSFET 104, a dead time in which both the MOSFETs become OFF is generally provided in the period from the OFF state of the N-channel MOSFET 104 to the ON state of the P-channel MOSFET 105.

During the dead time in which the N-channel MOSFET 104 and the P-channel MOSFET 105 are OFF, the energy stored in the choke coil 107 is transmitted to the output capacitor 106 via the body diode of the P-channel MOSFET 105. At this time, the forward diode voltage $Vf_{105}$ is generated in the P-channel MOSFET 105, whereby its power loss is large. For this reason, the dead time is set short.

After the dead time has passed, the gate voltage of the P-channel MOSFET 105 becomes 0 V (in the case that the output voltage Vout is 3.3 V, the gate-source voltage $Vgs_{105}$ is −3.3 V), and the P-channel MOSFET is turned ON. After the power loss at the P-channel MOSFET 105 is reduced, the energy stored in the choke coil 107 can be transmitted to the output capacitor 106.

In the switching power supply circuit in accordance with the embodiment, the N-channel MOSFET 104 and the P-channel MOSFET 105 are turned ON/OFF alternately via the dead time provided as described above, whereby the energy stored in the choke coil 107 is transmitted to the output capacitor 106 efficiently.

The voltage (counter electromotive force) generated by the energy stored in the choke coil 107 is superimposed on the input voltage Vin and transmitted to the output capacitor 106. The output capacitor 106 is charged with the transmitted energy. As a result, the output voltage Vout at the output terminal 112 is stepped up to a predetermined value higher than the input voltage Vin.

When the output voltage Vout becomes higher than [the input voltage Vin−the offset voltage Voff], the P-channel MOSFET 108 is turned OFF by the output of the differential amplifier 109. When the output voltage Vout becomes higher than the input voltage Vin, the P-channel MOSFET 108 is in the OFF state without fail. Hence, there is no reverse current flow from the output terminal 112 to the input terminal 111.

[Operation of the switching power supply circuit shown in FIG. 1 during the stop of voltage step-up operation]

Next, the operation during the stop of voltage step-up operation will be described below. During the stop of voltage step-up operation, the N-channel MOSFET 104 and the P-channel MOSFET 105 are fixed to the OFF state by the control via the control terminals VG1 and VG2 of the power supply control circuit 101.

While the switching power supply circuit stops the voltage step-up operation, the output voltage Vout of the output capacitor 106 lowers owing to discharge due to the consumption current of the power supply control circuit 101. FIG. 2 shows the change in the output voltage Vout with respect to time after the stop of voltage step-up operation.

Immediately after the stop of voltage step-up operation, the output voltage Vout is higher than the input voltage Vin. In the zone A of FIG. 2, the output voltage Vout of the output capacitor 106 lowers owing to discharge due to the consumption current of the power supply control circuit 101. As time passes after the stop of voltage step-up operation, the output voltage Vout becomes lower than the input voltage Vin.

In the zone A wherein the output voltage Vout is higher than [the input voltage Vin−the offset voltage Voff], the output of the differential amplifier 109 is the same as the output voltage Vout (High level), and the P-channel MOSFET 108 is maintained in the OFF state. Hence, reverse current flow from the output capacitor 106 to the input power supply 102, which may degrade the input power supply 102, is prevented.

When the output voltage Vout lowers further and reaches [the input voltage Vin−the offset voltage Voff], the output voltage control circuit 117 operates so that the output voltage Vout (=the power supply voltage $V_{101}$ of the power supply control circuit 101) does not lower further. More specifically, when the output voltage Vout becomes equal to [the input voltage Vin−the offset voltage Voff], the differential amplifier 109 outputs a Low-level voltage.

The output voltage of the differential amplifier 109 (=the gate voltage of the P-channel MOSFET 108) is negatively fed back linearly so as to become [the input voltage Vin−the offset voltage Voff]. Since the gate voltage of the P-channel MOSFET 108 is negatively fed back linearly by the differential amplifier 109, the output voltage Vout is maintained at the setting voltage of [the input voltage Vin of the input power supply 102−the offset voltage Voff] by the discharge current of the power control circuit 101 (in the zone B of FIG. 2).

As described above, during the stop of voltage step-up operation, the output voltage Vout (=the power supply voltage $V_{101}$ of the power supply control circuit 101) is maintained at the value represented by the following expression (7) by the negative feedback control of the output voltage control circuit 117.

$$Vout = Vin - Voff \qquad (7)$$

The operation start lower-limit voltage Vs viewed from the input power supply 102 is represented by the following expression (8). The V0 in the following expression (8) is the operation start lower-limit voltage of the power supply control circuit 101.

$$Vs = V0 + Voff \qquad (8)$$

The offset voltage Voff has a value higher than the variation in the input offset voltage of the differential amplifier 109. Even if the input offset voltage of the differential amplifier 109 has a variation, the voltage Vin of the input power supply 102 is made higher than the output voltage Vout without fail, whereby reverse current flow is prevented.

The operation start lower-limit voltage Vs viewed from the input power supply 102 can be lowered by setting the offset voltage Voff as low as possible in the range satisfying the above-mentioned condition. Generally speaking, the input offset voltage of the differential amplifier is approximately 6 to 7 mV. The offset voltage Voff is set at 0.1 V or less, for example.

As described above, the switching power supply circuit in accordance with the present invention can attain high power conversion efficiency and can lower the minimum input voltage at which the switching power supply circuit can start.

The configuration described below may also be used instead of the offset voltage supply 110 in accordance with the embodiment. The input voltage Vin and the output voltage Vout are divided using the voltage divider circuits 114 and 113, respectively, and input directly to the differential amplifier 109.

In the case that the input voltage Vin and the output voltage Vout are the same voltage, the voltage division ratios of the voltage divider circuits 113 and 114 are determined so that the voltage obtained by dividing the output voltage Vout and input to the noninverting input terminal of the differential amplifier 109 becomes higher than the voltage obtained by dividing the input voltage Vin and input to the inverting input terminal of the differential amplifier 109 by a predetermined voltage or a predetermined ratio. Alternatively, a circuit generating the predetermined voltage drop (offset voltage) Voff is inserted in the path from the input terminal 111 to the inverting input terminal of the differential amplifier 109.

A PNP transistor may also be used instead of the P-channel MOSFET 108. In this case, the output voltage of the differential amplifier 109 is applied to the base of the PNP transistor, and the PNP transistor is turned ON or OFF.

A diode, the anode of which is connected to the choke coil 107 and the cathode of which is connected to the output terminal 112, may also be used as a rectifying device, instead of the P-channel MOSFET 105 for synchronized rectification.

The present invention is useful for switching power supply circuits.

The present invention has an advantageous effect capable of realizing a switching power supply circuit that can attain high power conversion efficiency and can lower its operation start lower-limit voltage.

The present invention has an advantageous effect capable of realizing a switching power supply circuit that reduces a voltage drop caused in means for supplying a drive voltage to the power supply control circuit thereof.

The present invention has an advantageous effect capable of realizing a switching power supply circuit that prevents reverse current having a danger of degrading dry batteries.

Although the present invention has been described with respect to its preferred embodiment in some detail, the disclosed contents of the preferred embodiment may change in the details of the structure thereof, and any changes in the combination and sequence of the component may be attained without departing from the scope and spirit of the claimed invention.

The invention claimed is:

1. A switching power supply circuit comprising:
an input terminal to which an input voltage is input;
an output terminal from which an output voltage is output;
a choke coil and a rectifying device, connected in series between said input terminal and said output terminal, to which said input voltage is input and from which said output voltage is output;
a voltage step-up switching device, one terminal of which is connected between said choke coil and said rectifying device and another terminal of which is connected to the grounding point of said circuit;
a power supply control circuit, operating on said output voltage serving as a power supply source, for controlling said voltage step-up switching device and said rectifying device;
a transistor connected between said input terminal and said output terminal in parallel with the series connection of said choke coil and said rectifying device; and
a differential amplifier, to which a first voltage which is either said input voltage or a voltage derived from said input voltage and a second voltage which is either said output voltage or a voltage derived from said output voltage are input, for turning ON said transistor when said first voltage is higher than said second voltage and for turning OFF said transistor when said first voltage is lower than said second voltage.

2. A switching power supply circuit in accordance with claim 1, wherein said transistor is a P-channel MOSFET or a PNP transistor, said the first voltage is input to the inverting input terminal of said differential amplifier and said second voltage is input to the noninverting input terminal thereof, and the output voltage of said differential amplifier is applied to the gate of said P-channel MOSFET or the base of said PNP transistor.

3. A switching power supply circuit in accordance with claim 1, wherein when said input voltage and said output voltage are the same voltage, said second voltage is higher than said first voltage by a predetermined voltage or a predetermined ratio.

4. A switching power supply circuit in accordance with claim 1, wherein said rectifying device is a P-channel MOSFET, the gate of which is connected to said power supply control circuit, the drain of which is connected to said choke coil, and the source of which is connected to said output terminal.

5. A switching power supply circuit in accordance with claim 1, wherein said rectifying device is a diode, the anode of which is connected to said choke coil, and the cathode of which is connected to said output terminal.

* * * * *